April 15, 1969 R. S. SCHERMERHORN ET AL 3,438,649
OCCUPANT-PROPELLED VEHICLE HAVING A PLURALITY
OF WHEELS AND WEIGHT SECTIONS
Filed Jan. 26, 1967 Sheet 1 of 2

INVENTORS
ROBERT S. SCHERMERHORN
MIGUEL CARLOS GUERRERO
BY
*Robert J. Schaap*
ATTORNEY

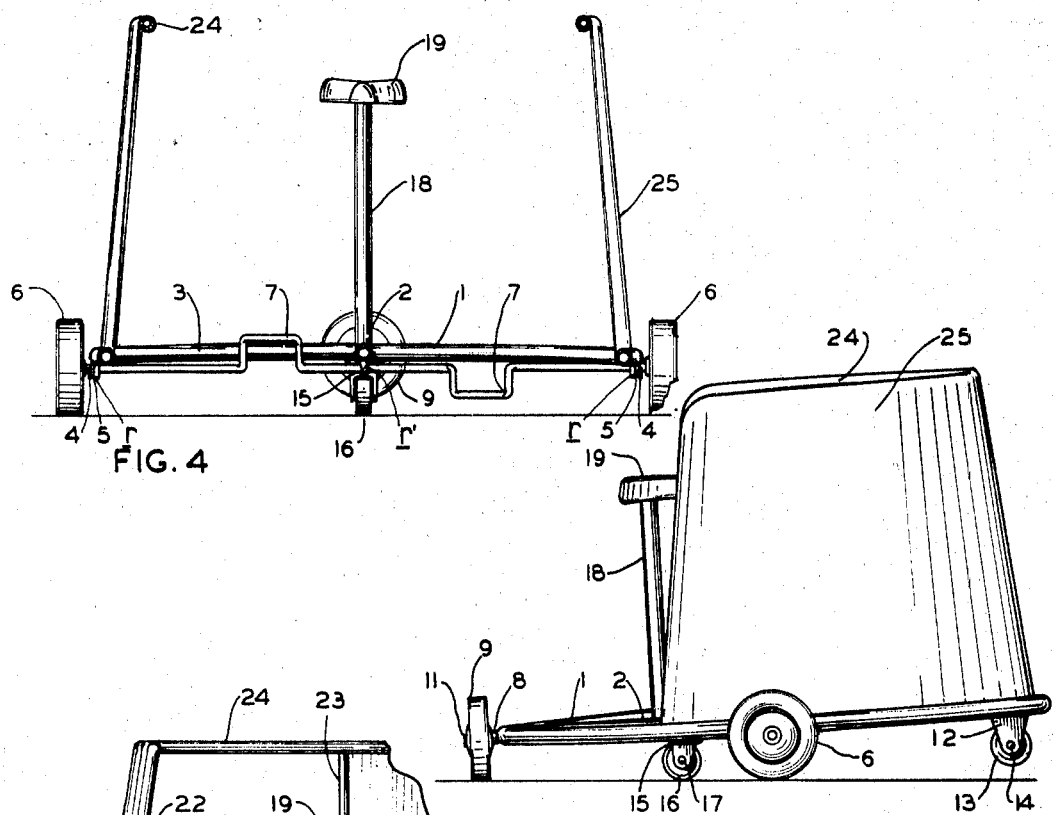
FIG. 4
FIG. 5
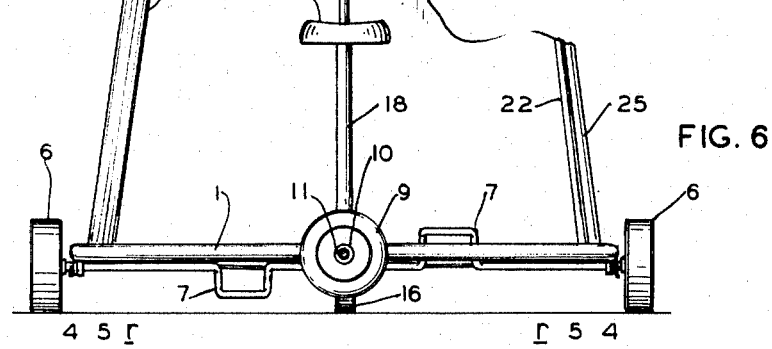
FIG. 6
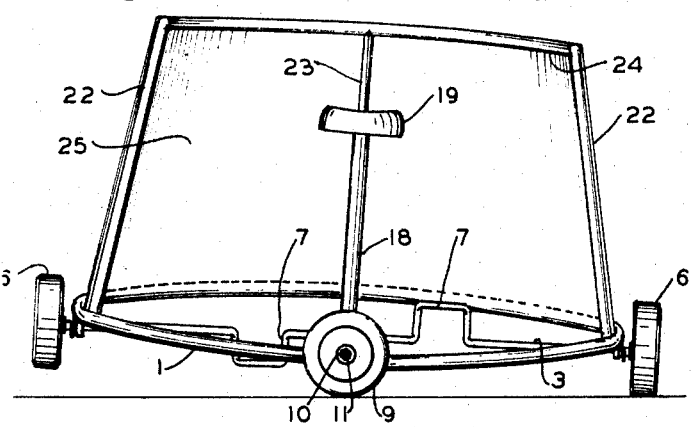
FIG. 7
INVENTORS
ROBERT S. SCHERMERHORN
MIGUEL CARLOS GUERRERO
BY *Robert J. Schaap*
ATTORNEY

United States Patent Office 3,438,649
Patented Apr. 15, 1969

3,438,649
OCCUPANT-PROPELLED VEHICLE HAVING A PLURALITY OF WHEELS AND WEIGHT SECTIONS
Robert S. Schermerhorn, Bridgeton, and Miguel Carlos Guerrero, Ferguson, Mo.; said Guerrero assignor to Richard B. Clement, Webster Groves, Mo.
Filed Jan. 26, 1967, Ser. No. 611,975
Int. Cl. B62m *1/02;* B62k *19/00*
U.S. Cl. 280—259         9 Claims

ABSTRACT OF THE DISCLOSURE

A vehicle having a circular frame with a pair of diametrally opposed driving wheels mounted centrally on the frame, a forward non-pivotal wheel and a pivotal caster located centrally of the frame but slightly rearwardly of the driving wheels. A rear wheel is mounted on the frame at a 90° angle with respect to the driving wheel. A seat and handle bar is also provided. In forward motion the vehicle is supported by the driving wheels, forward wheel and center caster. In turning, the child shifts his weight to either of the rear quadrants of the frame causing the vehicle to tilt rearwardly about the caster and rotate through the action of one of the driving wheels and the rear wheel.

---

This invention relates in general to certain new and useful improvements in toy vehicles and more particularly to a propelled vehicle which is capable of being maneuvered by a shifting of the weight of an occupant thereon.

It is a well known fact that children generally enjoy riding on a vehicle which they can propel through their own muscular activity. The large number of commercially available tricycles, bicycles, two-wheeled scooters, four-wheeled wagons and the like are testamentary of this condition. One of the important elements of each of these vehicles is the accomplishment of steering through a conventional steering mechanism. It has also been observed that children are fascinated by an object on which they can orient themselves through their own muscular activity, particularly in a sudden transition from a linear to a rotational motion. However, there is no commercially avialable device which enables a child to propel a vehicle and also orient the vehicle through a sudden transition from a linear to a rotational motion.

It is, therefore, the primary object of the present invention to provide a toy vehicle which can be propelled in a linear direction and can be oriented in direction through a transition of motion by a shifting of the weight of the occupant on the vehicle.

It is another object of the present invention to provide a toy vehicle of the type stated which is designed to yield a great deal of healthful play and exercise and which is also safe in its operation.

It is a further object of the present invention to provide a toy vehicle of the type stated which is of strong metal construction providing ruggedness and which is capable of withstanding the abuse to which it is normally subjected by children.

It is an additional object of the present invention to provide a toy vehicle of the type stated which is capable of being constructed on a mass production operation with a relatively low unit cost.

With the above and other objects in view, our invention resides in the novel features of form, construction, arrangement and combination of parts presently described and pointed out in the claims.

Figure 1:
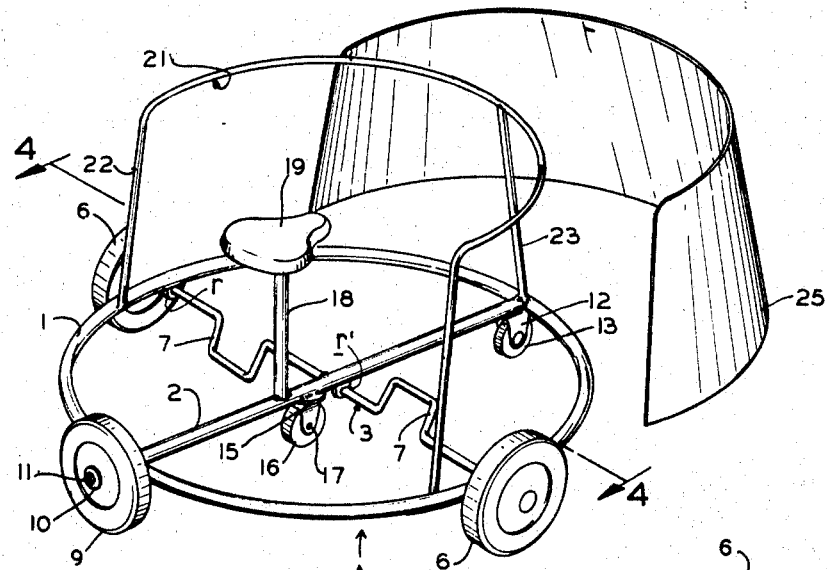
Figure 2:
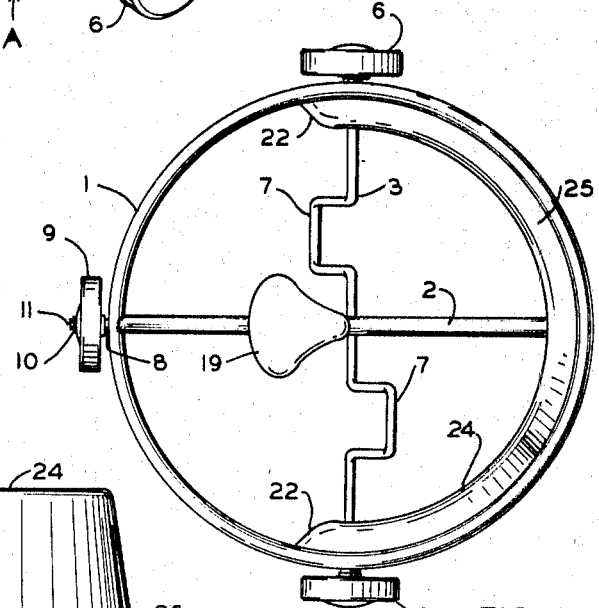
Figure 3:
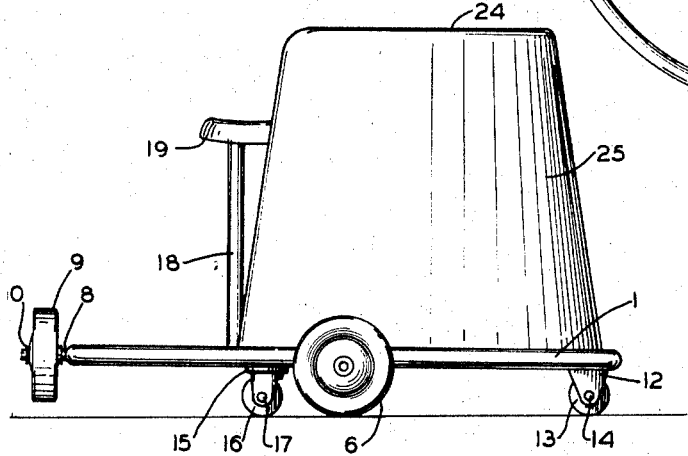

In the accompanying drawings:
FIGURE 1 is an exploded perspective view of a toy vehicle constructed in accordance with and embodying the present invention;
FIGURE 2 is a top plan view of the toy vehicle constructed in accordance with and embodying the present invention;
FIGURE 3 is a side elevational view of the toy vehicle of FIGURE 1 and showing the vehicle in a position where it is capable of being propelled in a forward direction;
FIGURE 4 is a vertical sectional view taken along line 4—4 of FIGURE 1;
FIGURE 5 is a side elevational view of the toy vehicle of FIGURE 1 and showing the vehicle in a position where it is capable of being pivoted about a point;
FIGURE 6 is a rear elevational view of the toy vehicle of FIGURE 1 and showing the vehicle in a position where it is capable of being propelled in a forward direction; and
FIGURE 7 is a rear elevational view of the toy vehicle of FIGURE 1 and showing the vehicle in a position where it is capable of being pivoted about a point.

General description

Generally described and without restriction upon the scope of the appended claims, the present invention resides in a toy vehicle which has a substantially circular frame with a longitudinally extending crossbar secured thereto. An axle is transversely mounted on the frame and a driving wheel is mounted on each end of the axle for rotation with respect to the frame. The axle is provided with a pair of oppositely disposed cranks for causing rotation of the axle and of the driving wheels. A front wheel is mounted on the frame substantially along the longitudinal centerline of the frame and is diametrally smaller than the driving wheels. A rear wheel which may be slightly diametrally smaller than the driving wheels is mounted on the rear of the frame substantially along the longitudinal centerline. The front wheel is located in a plane which is substantially parallel to the driving wheels and the rear wheel is mounted in a plane which is located at a 90° angle with respect to the driving wheels.

A pivotal and rotatable caster is mounted on the longitudinal crossbar slightly rearwardly of the driving wheels, and is supportive of the vehicle or is located in a plane which is slightly higher than any of the driving wheels forming part of the vehicle when the front wheel is on the ground. The caster serves as a pivoting point for orienting the vehicle in any direction.

A semicircular handle is secured to the frame and the longitudinal crossbar and a seat is secured to a support shaft which is, in turn, secured to the crossbar slightly rearwardly of the center caster. The occupant is supported on the seat and maintains stability by grasping the handle.

The cross bar divides the frame into two longitudinal weight sections. The center caster is so located so that a transverse line passing through the caster and substantially perpendicular to the cross bar divides the frame into left and right rear quadrants and left and right front quadrants. The occupant is able to orient the vehicle in any direction by shifting his weight thereon so that a substantial portion of his weight resides in the forward or either of the rearward quadrants. Since the caster is slightly above the driving wheels and also located slightly rearwardly thereof, forward motion is achieved by shifting a portion of the weight of the occupant to the forward quadrants causing stability of the vehicle on the driving wheels and front wheel and caster. Shifting of the weight to either of the rear quadrants will cause the vehicle to pivot on the caster and rotation will occur when the rear wheel is lowered to the plane of the caster and one of the driving wheels. A combination of these shifting movements will enable the occupant to create forward motion with any desired rotational motion.

*Detailed description*

Referring now in more detail and by reference characters to the drawings, A designates a toy vehicle generally for children and which comprises a substantially circular frame 1. Welded or otherwise rigidly secured to the frame 1 is a longitudinally extending crossbar 2. The frame 1 and the crossbar 2 may be formed of standard rolled shape of steel or similarly strong and durable metal. The frame 1 and crossbar 2 may also be formed of any single piece of tubing properly bent and curved to form the desired shape and welded to provide proper construction. It should be recognized that any number of individual pieces welded or otherwise rigidly secured in the proper manner could be used to make the frame 1 and crossbar 2. The frame 1 may also be constructed in the form of a rotatably supported platform from any rigid material such as plywood or metal plate. In this construction the platform would be provided with properly positioned crank receiving apertures.

Welded or otherwise rigidly secured to the underside of the frame 1 are a pair of substantially circular axle support rings r which may be formed with flats at their upper ends for rigid securement to the frame 1. Similarly welded or otherwise secured to the underside of the crossbar 2 is an axle support ring r' which is coaxially aligned with the axle support rings r. A transversely extending axle 3 is concentrically disposed in the rings r, r' and is sized to extend outwardly on each side of the frame 1. The interior annular surfaces of the rings r, r' serve as bearing surfaces for providing rotative support of the axle 3. The axle 3 is retained in the support rings r, r' by means of cotter pins 4 fitted in apertures formed in the axle 3 and being located at each of the exterior annular margins of the rings r, r'. Washers 5 may also be disposed about the axle 3 on each of its transverse ends for bearing engagement against the frame 1. A pair of drive wheels 6 are mounted on the transverse ends of the axle 3 and are rotatable therewith. The axle 3 and hence the line of rotation of the drive wheels 6 is located approximately at the midpoint of the longitudinal center of the frame 1. Furthermore, thed rive wheels 6 may be retained on the axle 3 by any conventional means such as by a keyed slot (not shown). The axle 3 is shaped to provide oppositely disposed cranks 7 which are adapted to be operated by the feet of a rider of the vehicle. The cranks 7 may be conventionally provided with pedals (not shown) if desired.

Rigidly secured to the rearward end of the frame 1, reference being made to FIGURE 1, is a stub shaft 8 which extends rearwardly of the frame 1 and coaxially with the crossbar 2, and rotatably mounted on the outer end thereof, is a rear wheel 9. The rear wheel 9 may be suitably retained on the stub shaft 8 by means of cotter pins or any conventional means such as washers 10 and lock nuts 11 as illustrated. Furthermore, the rear wheel 9 may be slightly diametrally smaller than either of the drive wheels 6 so that it is not necessarily in contact with the ground when the drive wheels 6 are actuated, in a manner to be more fully described in detail hereinafter.

Welded or otherwise rigidly secured to the underside of the forward end of the frame 1 and the cross bar 2 is a non-pivotal caster-like wheel frame 12 for rotatably supporting a front wheel 13 by means of an idler shaft 14. By further reference to FIGURE 1, it can be seen that the front wheel 13 is considerably diametrally smaller than either of the drive wheels 6 or the rear wheel 9. A pivotal caster frame 15 is pivotally secured to the underside of the cross bar 2 slightly rearwardly of the axle 3 for rotatably supporting a center wheel or so-called "caster wheel" 16 by means of a caster shaft 17. By reference to FIGURE 2, it can be seen that when the frame 1 of the vehicle A is disposed in a position where the frame is substantially parallel to the ground or other flat supporting structure, the front wheel 13 is not in contact with the ground.

By means of the above-outlined construction, it can be seen that when the vehicle is propelled in a forward direction, the front wheel 13 and the two drive wheels 6 are in contact with the ground. Since the front wheel 13 is slightly elevated with respect to the drive wheels 6 when the frame 1 is parallel to the ground, the frame 1 will be tilted slightly forward when the front wheel 13 does contact the ground. Generally, the frame 1 should not tilt or become angularly displaced beyond 15° with respect to the horizontal. It should also be noted that the center wheel 16 could be so mounted that it could remain in contact with the ground, when the vehicle is propelled in a forward direction. However, since the front wheel 13 is not pivotal with respect to the frame 1, no transition from a linear motion to a rotation motion will occur, even if the center wheel 16 does normally contact the ground when the vehicle is propelled in a forward direction.

It can also be seen that when the rear wheel 9 is in contact with the ground, only one of the drive wheels 6 will be in contact with the ground and the center wheel 16 will also be in contact with the ground. Since the rear wheel 9 is located in a plane which is located at 90° angles with respect to the plane of rotation of the drive wheels 6, the vehicle will tend to pivot about the center wheel 16 when the rear wheel 9 is shifted downwardly in vehicle supporting position.

A supporting rod 18 is welded or otherwise rigidly secured to the crossbar 2 slightly rearwardly of the axis of rotation of the center wheel 16, and rigidly secured to the upper end thereof is a conventional seat 19. By reference to FIGURE 1, it can be seen that the seat 19 is located in a position where the average child can be supported thereon and still engage the cranks 7 for propelling the vehicle. A semi-circular handle-forming frame 21 is also secured to the frame 1 and comprises a pair of upstanding struts 22 secured to the frame 1 and a forward strut 23 secured to the crossbar 2. A semi-circular handle bar 24 is welded to the upper ends of the struts 22, 23 in the manner as illustrated in FIGURE 1.

It can be seen that the construction of the vehicle actually subdivides the frame 1 into four quadrants or so-called "weight sections." The four quadrants are formed by the longitudinally extending crossbar 2 and the axle 3 so that two rear quadrants and two front quadrants exist. The front two quadrants actually serve as only one weight section since the vehicle is supported on the same four wheels and only these four wheels when the vehicle is propelled in a forwardly direction. Furthermore, it can be seen that no transverse displacement will take place when the vehicle is propelled in a forward direction due to the presence of only one pivotal wheel in this condition.

Removably disposed about and also removably secured to the handle forming frame 21 is a semi-circular shield 25 which can be secured to the handle bar 24 and the struts 22, 23 by any conventional snap fasteners or similar conventional securement means. The shield 25 may be imprinted on its exterior surface with any aesthetic design which may be appealing to children. The shield 25 may be formed of a thin metal plate or may be molded from any suitable synthetic resin or plastic material such as polystyrene or polyvinylchloride. The shield 25 may also be constructed of a cloth material such as canvas. It may also be formed with a light portable frame for fitting around and attachment to the handle forming frame. Furthermore, a plurality of interchangeable shields 25 of substantially identical construction but different external design, may be provided with each vehicle.

It should also be recognized that the device of the present invention can be conventionally provided with suitable accessories such as lights and horns and other gadgetry which is appealing to children. Furthermore, the vehicle could be equipped with a small horsepower gas or electric motor for driving the axle 3 and drive wheels 6.

*Operation*

In use, the child operating the vehicle will straddle the seat 19 and engage the cranks 7 for rotation of the axle 3. In this connection, it should be understood that the support rod 18 can be made into telescoping sections with a conventional locking mechanism so that the seat 19 can be raised and lowered with respect to the frame 1. The occupant is, of course, able to maintain stability on the vehicle by grasping the handle bar 24.

When the occupant wishes to propel the vehicle in a forward direction, the occupant's weight is shifted forwardly so that the two drive wheels 6, the front wheel 13 and the center wheel 16 are in contact with the ground in the manner as illustrated in FIGURES 3 and 6. Inasmuch as the center wheel 16 is the only wheel which is pivotal, the vehicle will always be propelled in a forward direction. Furthermore, it can be seen that since the weight of the occupant is directed forwardly, that is in the two front quadrants, the rear wheel 9 cannot contact the ground. Even if the occupant should shift the greater portion of his weight to either one of the front quadrants, the vehicle cannot turn or translate his motion in any direction.

When the occupant wishes to turn the vehicle or even pivot centrally about a particular point, the occupant shifts the greater portion of his weight to either of the rear quadrants, thereby causing the vehicle to pivot in a rearward direction, reference being made to FIGURE 1, about the center wheel 16. As this occurs, the front wheel 13 will be lifted from the ground and the rear wheel 9 will contact the ground. Due to the relative positions of the drive wheels 6 and the center wheel 16, only three wheels of the vehicle can be in contact with the ground at any one time when the greater portion of the weight of the occupant resides in both or either of the rear two quadrants. In actual practice, it is not actually necessary for the occupant to physically move or change his or her position on the vehicle; but merely to shift his or her weight to the extent necessary to cause the vehicle to pivot about the center wheel 16, so that either the front wheel 13 or rear wheel 9 is lifted from the ground and the other is shifted into contact with the ground. It can be seen by reference to FIGURES 5 and 7, that when the frame 1 is tilted rearwardly, the center wheel 16 assumes a position which is slightly lower than either of the drive wheels 6, if the frame 1 were not tilted transversely.

When a sufficient portion of the weight of the occupant has been shifted to cause the vehicle to pivot so that the rear wheel 9 is in contact with the ground, only one drive wheel 6 will remain in contact with the ground along with the center wheel 16, as illustrated in FIGURE 5. If the weight has been shifted so that the left drive wheel 6 remains in contact with the ground, then the vehicle will pivot to the right about the center wheel 16. Actually the direct linear motion in the forward direction will be suddenly changed into a pivotal motion about the center wheel 16, causing a sudden change of direction of the vehicle. In similar manner, if a sufficient portion of the weight of the occupant has been shifted to the right rear quadrant, then the right drive wheel 6, the center wheel 16 and the rear wheel 9 will remain in contact with the ground. In this case, the vehicle will pivot to the left.

It can thus be seen that the vehicle A is completely maneuverable in that the occupant can propel the same in a forward direction and suddenly turn the vehicle by shifting his weight to either of the rear quardrants. The degree of turn which occurs as a result of the occupant shifting his weight is dependent upon the amount of time that the occupant holds the greater portion of his weight in the rear quadrants. By continually holding his weight so that the rear wheel 9 is always in contact with the ground, the occupant can pivot the vehicle through an arc which is greater than 90° or the occupant can pivot the vehicle about the center wheel 16 in one particular spot. By a combination of shifting movements in a forward direction and rearward direction, the occupant can propel the vehicle in a forward direction and can make left and right turns through any desired arc. This type of construction enables the occupant to have complete control over the vehicle and to orient the vehicle by a sudden transition of motion by a slight shifting of weight.

As used herein, the term "transition" or the term "transition of motion" refers to a change in the type of motion, i.e. a change from a linear to a rotational motion or a change from a rotational to a linear motion. These terms also encompass a series of changes, e.g. a change from linear to a sudden rotational motion and back to a linear motion.

The device of the present invention is constructed in such manner, including considerations of the center of gravity of the vehicle, the inertial moments at various speeds and leverage actions, so that only excessive forces could upset the stability of the vehicle. Accordingly, the vehicle of the present invention inherently includes a high margin of safety.

Having thus described our invention, what we desire to claim and secure by Letters Patent is:

1. A vehicle capable of being propelled in a linear direction and oriented in direction through a transition of motion by an occupant, said vehicle comprising a frame, a plurality of wheels operatively mounted on said frame substantially near the periphery thereof, each of said wheels being nonpivotal but rotatable with respect to said frame, means operatively associated with said frame for propelling said vehicle, at least one of said wheels being angularly disposed with respect to the other of said wheels, at least one additional wheel being mounted on said frame interiorly of the periphery of said frame and being both pivotal and rotatable with respect to said frame, said additional wheel being slightly lower than all other wheels on said vehicle when said frame is substantially parallel to a relatively flat supporting surface on which said vehicle can be operated, each of said wheels being mounted so that a plurality of weight sections are formed in said vehicle, said wheels being located with respect to said weight sections so that a substantial portion of the weight of the occupant on one section will cause motion in a linear direction and a substantial portion of the weight of the occupant on another section will cause a transition of motion.

2. A vehicle capable of being propelled in a linear direction and oriented in a direction by transition of motion by an occupant, said vehicle comprising a planar frame having a median longitudinal axis located in a direction with vehicle forward and rearward movement and a median transverse axis, a pair of oppositely disposed driving wheels operatively mounted on said frame, means operatively associated with said driving wheels for propelling the same, a third wheel mounted on said frame substantially at the median longitudinal axis and being located forwardly of said driving wheels for rotation only in a plane parallel to said median longitudinal axis, a fourth wheel operatively mounted on said frame rearwardly of said driving wheels, said fourth wheel being angularly located with respect to said driving wheels, a fifth wheel is operatively mounted on said frame and is pivotal with respect to said frame, said fifth wheel being slightly lower than all other wheels on said vehicle when said frame is substantially parallel to a relatively flat supporting surface on which said vehicle can be operated, said wheels being located so that said frame is formed with a forward weight section and at least one rearward weight section so that a substantial portion of the weight on the forward section will cause motion in a linear direction and a substantial portion of the weight of the occupant on the rearward section will cause a transition of motion.

3. The vehicle of claim 2 further characterized in that said fourth wheel is located in a plane which is disposed at a 90° angle with respect to said driving wheels.

4. The vehicle of claim 2 further characterized in that a seat is operatively mounted on said frame rearwardly of said driving wheels.

5. The vehicle of claim 2 further characterized in that a handle-forming member is operatively mounted on said frame and extends upwardly therefrom.

6. The vehicle of claim 5 further characterized in that a removable cover shield is secured to said handle-forming member.

7. The vehicle of claim 2 further characterized in that an axle extends transversely across said frame and said driving wheels are mounted on said axle, and the means for propelling the wheels are a pair of cranks.

8. The vehicle of claim 2 further characterized in that the fourth wheel and the fifth wheel are positioned to engage a plane which is nonparallel to the plane passing through the longitudinal and transverse axes of said frame.

9. The vehicle of claim 2 further characterized in that the driving wheels and third and fifth wheels are positioned to engage a plane which is parallel to the plane passing through the longitudinal and transverse axes of said frame.

References Cited

UNITED STATES PATENTS

| | | | |
|---|---|---|---|
| 2,635,916 | 4/1953 | Hammond | 296—78 |
| 3,306,627 | 2/1967 | Goto | 280—259 |

KENNETH H. BETTS, *Primary Examiner.*

U.S. Cl. X.R.

280—282